US007266936B2

(12) United States Patent
Wingert

(10) Patent No.: US 7,266,936 B2
(45) Date of Patent: Sep. 11, 2007

(54) AGRICULTURAL BAGGER WITH SHIELDED HOPPER AGITATION AND METHOD

(76) Inventor: Paul R. Wingert, Country Road 8, R.R. 1 - Box 192, Plainview, MN (US) 55964

(*) Notice: Subject to any disclaimer, the term of this patent is extended or adjusted under 35 U.S.C. 154(b) by 0 days.

(21) Appl. No.: 10/848,239

(22) Filed: May 16, 2004

(65) Prior Publication Data

US 2005/0051040 A1 Mar. 10, 2005

Related U.S. Application Data

(60) Provisional application No. 60/471,372, filed on May 15, 2003.

(51) Int. Cl.
 *B65B 1/24* (2006.01)
 *B65B 63/02* (2006.01)
(52) U.S. Cl. .................... 53/438; 53/439; 53/529; 53/576; 100/94; 100/100
(58) Field of Classification Search .............. 53/437, 53/438, 439, 525, 529, 530, 567, 576, 570, 53/513, 526, 528; 100/70 A, 94, 100, 177
See application file for complete search history.

(56) References Cited

U.S. PATENT DOCUMENTS

| | | | |
|---|---|---|---|
| 3,179,131 A | 4/1965 | Kissling | 53/439 |
| 3,613,926 A | 10/1971 | Scroggins | 214/520 |
| 3,771,733 A * | 11/1973 | Hadley et al. | 241/186.35 |
| 3,783,578 A | 1/1974 | Willis et al. | 53/24 |
| 3,876,055 A | 4/1975 | Tyznik | 198/7 |
| 3,884,395 A * | 5/1975 | Keenan | 222/612 |
| 4,046,068 A | 9/1977 | Eggenmuller et al. | 100/65 |
| 4,072,273 A | 2/1978 | Reiniger | 241/24 |
| 4,095,604 A * | 6/1978 | Labbe | 131/84.1 |
| 4,100,023 A | 7/1978 | McDonald | 195/27 |
| 4,241,562 A | 12/1980 | Meyer | 53/438 |
| 4,310,036 A | 1/1982 | Rasmussen et al. | 141/114 |
| 4,344,580 A | 8/1982 | Hoshall et al. | 241/60 |
| 4,501,382 A * | 2/1985 | van Twuyver | 222/64 |
| 4,502,378 A | 3/1985 | Cullen | 100/65 |
| 4,548,131 A * | 10/1985 | Williams | 100/100 |
| 4,584,790 A | 4/1986 | Gaughen | 47/56 |
| 4,611,642 A | 9/1986 | Durhman | 141/114 |
| 4,621,666 A | 11/1986 | Ryan | 141/114 |
| 4,672,794 A | 6/1987 | Good | 53/440 |
| 4,686,817 A | 8/1987 | Brodrecht et al. | 53/567 |
| 4,688,480 A | 8/1987 | Ryan | 100/144 |
| 4,712,362 A | 12/1987 | Cornet et al. | 56/16.5 |
| 4,721,503 A | 1/1988 | Rasmussen et al. | 493/413 |
| 4,724,876 A | 2/1988 | Ryan | 141/114 |
| 4,766,717 A | 8/1988 | Thomann | |

(Continued)

*Primary Examiner*—Louis Huynh
(74) *Attorney, Agent, or Firm*—Charles A. Lemaire; Lemaire Patent Law Firm, P.L.L.C.

(57) ABSTRACT

An agricultural bagger apparatus and method for compacting feed into a horizontally deployed bag including a moving hopper wall and+ mechanism for moving the wall at an input end of hopper. The wall moving mechanism and the moving wall of the hopper sweeps the feed adjacent to the sloping wall to prevent feed bridging. A safety enclosure isolates the wall moving mechanism from contaminants and prevents exposure to the wall moving mechanism. Some embodiments also compact feed in the upper portion of a tunnel, for example, by reciprocating a hinged piston above a primary compression mechanism.

28 Claims, 8 Drawing Sheets

U.S. PATENT DOCUMENTS

| | | | |
|---|---|---|---|
| 4,803,832 A | 2/1989 | Crawford | |
| 4,867,736 A | 9/1989 | Rasmussen et al. | 493/413 |
| 4,899,867 A | 2/1990 | Ryan | 198/513 |
| 4,907,503 A | 3/1990 | Ryan | 100/65 |
| 4,949,633 A | 8/1990 | Johnson et al. | 100/65 |
| 4,955,188 A | 9/1990 | von Allwörden | |
| 5,140,802 A | 8/1992 | Inman et al. | 53/459 |
| 5,151,000 A * | 9/1992 | Geraghty et al. | 414/187 |
| 5,155,975 A * | 10/1992 | Knowler | 53/527 |
| 5,178,061 A | 1/1993 | Alonso-Amelot | 100/65 |
| 5,197,682 A * | 3/1993 | Del Zotto | 241/101.76 |
| 5,213,143 A | 5/1993 | Policky et al. | 141/71 |
| 5,215,228 A * | 6/1993 | Andrews et al. | 222/203 |
| 5,220,772 A | 6/1993 | Koskela et al. | 53/576 |
| 5,295,554 A | 3/1994 | Cullen | 180/236 |
| 5,297,377 A | 3/1994 | Cullen | 53/527 |
| 5,313,768 A | 5/1994 | Cullen | 53/570 |
| 5,345,744 A | 9/1994 | Cullen | 53/128.1 |
| 5,355,659 A | 10/1994 | Cullen | 53/567 |
| 5,367,860 A | 11/1994 | Cullen | 53/567 |
| 5,396,753 A | 3/1995 | Cullen | 53/567 |
| 5,398,736 A | 3/1995 | Cullen | 141/114 |
| 5,408,809 A | 4/1995 | Cullen | 53/567 |
| 5,408,810 A | 4/1995 | Cullen | 53/567 |
| 5,413,155 A | 5/1995 | Ryan | 141/114 |
| 5,419,102 A | 5/1995 | Inman et al. | 53/567 |
| 5,421,142 A | 6/1995 | Cullen | 53/567 |
| 5,425,220 A | 6/1995 | Cullen | 53/527 |
| 5,426,910 A | 6/1995 | Cullen | 53/128.1 |
| 5,452,562 A | 9/1995 | Cullen | 53/428 |
| 5,461,843 A | 10/1995 | Garvin et al. | 53/434 |
| 5,463,849 A | 11/1995 | Cullen | 53/527 |
| 5,464,049 A | 11/1995 | Cullen | 141/114 |
| 5,469,693 A | 11/1995 | Brodrecht | 53/567 |
| 5,517,806 A | 5/1996 | Cullen | 53/527 |
| 5,519,990 A | 5/1996 | Rodewald et al. | |
| 5,566,532 A | 10/1996 | Inman et al. | 53/529 |
| 5,570,565 A | 11/1996 | Simpson | 53/435 |
| 5,724,793 A | 3/1998 | Inman et al. | 53/576 |
| 5,799,472 A | 9/1998 | Cullen | 53/567 |
| 5,860,271 A | 1/1999 | Inman et al. | 53/527 |
| 5,878,552 A | 3/1999 | Wingert | 53/438 |
| 5,894,713 A | 4/1999 | Cullen | 53/436 |
| 6,061,999 A | 5/2000 | Wingert | 53/438 |
| 6,430,897 B1 | 8/2002 | Cameron et al. | 53/436 |
| 6,516,590 B2 | 2/2003 | Inman et al. | |
| 6,708,851 B2 * | 3/2004 | DaSilva | 222/200 |
| 7,024,839 B2 | 4/2006 | Wingert | |
| 2003/0070399 A1 * | 4/2003 | Wingert | 53/567 |

* cited by examiner

AGRICULTURAL BAGGER WITH SHIELDED HOPPER AGITATION AND METHOD

RELATED APPLICATIONS

Benefit is claimed under 35 U.S.C. 119(e) to U.S. Provisional Application Ser. No. 60/471,372, entitled "AGRICULTURAL BAGGER WITH SHIELDED HOPPER AGITATION AND METHOD" by Paul Wingert, filed May 15, 2003, which is herein incorporated in its entirety by reference.

FIELD OF THE INVENTION

This invention relates to the field of agricultural baggers, and more specifically to a method and apparatus for more safely preventing bridging of feed in the input chute.

BACKGROUND OF THE INVENTION

Horizontally expandable, silage storage bags are commonly used as an alternative to permanent feed storage structures such as barns and silos. From an economic standpoint, an expandable plastic storage bag is preferable to a more elaborate, permanent structure. Further, the expandable bags are more easily loaded with feed than permanent structure and the silage stored therein is readily accessible for use, for example using a small tractor with a front bucket to unload the feed.

An exemplary prior art bagger is described in U.S. Pat. No. 5,878,552 (which patent is incorporated herein in its entirety by reference), to Paul Wingert, the present applicant. A tractor-powered bag-loading apparatus is disclosed in association with an expandable bag. A backstop is located at the filled end of the bag and has attached thereto laterally spaced cables which extend forward to rotatable cable drums on the bagger machine. The drums are yieldably braked and, under a predetermined force applied to the cables, release the cable to allow movement of the bag-loading apparatus and tractor away from the filled end of the bag as it is filled. The bag is filled by a toothed rotor which propels silage through a tapered tunnel and into the bag inlet. The tapered tunnel described in U.S. Pat. No. 5,878,552 provides a smooth, more evenly filled bag.

The bag for use with such bagging machines is manufactured and delivered in a pleated shape, i.e., folded into an accordion-bellows-type shape. Typically, a bag having a nominal ten-foot-diameter (approximately 3 meters diameter, or 9.6 meters circumference) and a 300-foot length (approximately 90 meters length) will be folded to a 10-foot-diameter (about 3 meters) ring about one foot (about 0.3 meter) long and 1 foot (about 0.3 meter) thick. To start the loading operation, this bag-ring is pre-loaded around the tunnel, and the pleats are unfolded one at a time as the bag is deployed and filled- with feed stock. Once any portion of the bag fills with feed, that portion becomes very heavy, and does not move. Thus the bagger machine itself is propelled along the ground in front of the bag being filled.

One exemplary bagging machine is described in U.S. patent application Ser. No. 09/721,268 filed on Nov. 22, 2000, entitled "Improved Agricultural Feed Bagger and Method" by Paul Wingert, the inventor of the present application. U.S. patent application Ser. No. 09/721,268 is incorporated in its entirety by reference. In some embodiments of the present invention, a large conveyer-belt bed, as described in U.S. patent application Ser. No. 09/721,268, is provided for loading voluminous quantities of agricultural material into its hopper.

There are numerous problems that one contends with using previous bagging structures. For example, there is a safety problem caused by feed that bridges within the tapered input hopper. Persons may be tempted to unclog the hopper by stomping or otherwise inserting an arm or a leg thus risking being sucked through and shredded by the primary compression mechanism. patent application Ser. No. 09/977,036 (incorporated herein by reference) filed Oct. 11, 2001 by Paul Wingert, the inventor of the present invention, provided several embodiments that churned the feed to prevent bridging of feed in the input hopper, and that had fixed safety shields over portions of the moving parts. Apparatus and methods for increasing compaction in the upper tunnel were also described.

As more fully described in patent application Ser. No. 09/977,036, one way to help prevent bridging is to churn or move the feed in hopper 160, for example using an arm 162 that moves in a curvical motion 163, since it is connected to arm 165 that moves in a circular motion driven by motor 166 (e.g., a hydraulic motor, in some embodiments), and arm 162 is also connected to arm 164 that moves in a wiper-blade motion. Thus the curvical motion of arm 162 helps prevent feed from bridging against sloping wall 161 by moving feed 98 towards rotor 130. Sloping shield wall 167 provided additional safety by enclosing much of the moving part of the arm 162, and much or all of arms 164 and 165. However, now bridging could occur against the stationary sloping shield wall 167, although this was further from rotor 130 and at a portion of chute 137 that was larger in cross sectional area, so the bridging problem was reduced. Also, for feed that could reach to the lower edge of arm 162, there was a relatively small area of arm 162 that pushed down on the feed to move the feed toward rotor 130.

Conventional baggers also suffer from an inability to adequately compact feed in the upper and lower portions of the tunnel, thus leaving the feed in the lower bag highly compacted and the feed in the upper bag only moderately compacted.

SUMMARY OF THE INVENTION

The invention provides an agricultural bagger apparatus for compacting feed into a horizontally deployed bag. The apparatus includes a primary compression mechanism and an input hopper that receives agricultural feed. The hopper has a sloping wall and a lower-end exit chute located to transfer the agricultural feed into the primary compression mechanism. The apparatus also includes a moving wall as at least part of the sloping inside wall of the input hopper to move the agricultural feed that was adjacent to the sloping wall toward the primary compression mechanism in order to prevent feed bridging in the hopper before the primary compression mechanism.

Another aspect of the invention is a method that improves the flow of agricultural feed in an agricultural feed stock bagging machine having a tunnel and a primary compression mechanism fed by a hopper with a sloping wall. The feed is deposited into a hopper and pressure within the feed along the sloping wall is displaced and feed is swept along by the moving wall to reduce the tendency for the feed to bridge in the hopper in order that the feed continuously flows toward the primary compression mechanism. This is a further safety innovation to prevent a situation where a bagger machine operator might otherwise climb into the input hopper in a dangerous attempt to free the bridged feed and restart the flow of feed through the hopper. By preventing the clogged feed, there is even less motivation for a person to foolishly insert an arm or foot into the hopper.

Yet another aspect of the invention provides a method for extruding into a feed bag connected to a feed tunnel. The method includes deploying the bag from a position substantially at the back edge of the primary compression such that the lower portion of the feed drops substantially to ground level within the bag as soon as it leaves the primary compression stage. The exit surface between the exit end of the tunnel under the hopper and the ground is substantially vertical. This further compresses the feed in the lower bag, since it does not need to be pushed across a sloping lower exit surface after leaving the primary compression stage. Some embodiment also include compacting feed from the upper portion of the tunnel toward the upper central portion of the tunnel, and displacing pressure from the mid-level portion of the tunnel just above the primary compression stage and into the upper portion of the tunnel. In some embodiments, the compacting feed from the upper portion of the tunnel further includes reciprocating a piston connected to a hinged apparatus above the primary compression mechanism to displace pressure inside the feed tunnel above the primary compression mechanism. This increases the compaction on the top portion of the tunnel without unduly juicing the feed.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
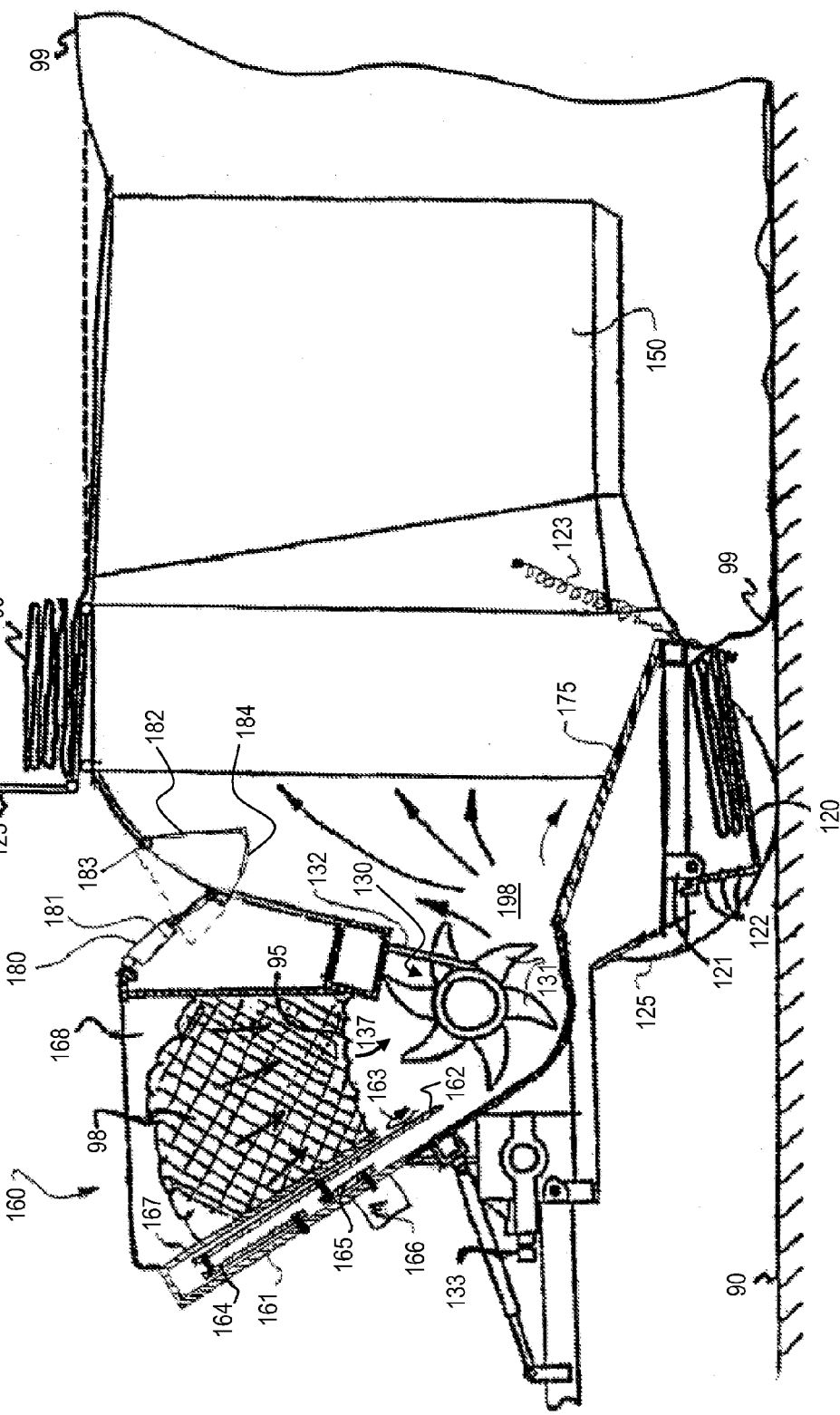
FIG. 1 shows a side view of a bagging machine 100.

FIG. 1 shows a side view of a bagger 100 (also called feed-bagging machine 100) such as shown and described in U.S. Patent Application patent application Ser. No. 09/977, 036 filed Oct. 11, 2001 by Paul Wingert, the inventor of the present invention, hereby incorporated by its entirety by reference. The feed bagger 100 is not pulled, rather, the pressure from the feed 98 filling the bag 99 pushes the bagger 100 and the tractor (not shown) that is powering bagger 100 ahead at a rate equal to the filling rate of bag 99. A steel cable between bagger 100 and a backstop (not shown, but which is to the right of the apparatus and bag shown in FIG. 1) is yieldably held by a disk-brake mechanism. This ensures the feed is compacted before the bagger is allowed to advance. The primary compression mechanism includes a rotor 130 having multiple teeth 131, and powered by a power-take-off (PTO) shaft 133 from the tractor that powers bagger 100, forces feed 98 up and back into a tunnel 150. In some embodiments, tunnel 150 is a long tapered tunnel such as described in U.S. Pat. No. 5,878,552 by the inventor of the present invention, hereby incorporated by its entirety by reference.

Movable upper bag bracket 125 is used to lift the folded bag 99 into place on the outside of tunnel 250, and supports/ holds the folded bag 99 at the front end of the top of tunnel 250 as it unfolds from the inside of the folded bag. Lower bag tray 120 is tilted up at its trailing edge, supported at its front edge by brackets 121 connected to one of a plurality of rungs 122 (for adjustability), and yieldably supported at its back edge by spring-and-chain 123 (which can have its force adjusted by setting various chain links of the chain onto a fixed hook at the top). The input feed 98 is dropped into hopper 160. Such a bagger 100 has a tunnel 150 that provides some support for bag 99 as it unfolds, but which has side walls along which the bag unfolds that are ovoid or tapered inward at the back such that the bag is stretched slightly and then released as it passes over tunnel 150 that moves in the direction of travel of the bagger 100. The bag 99, once deployed and filled with feed does not move relative to ground 90. The bagger tunnel 150 provides some back-pressure to the feed which thus extrudes into the bag rearward at a substantially constant pressure.

Positioned between the exterior wall 161 of hopper 160 and the fixed wall 167 is a distribution mechanism 170 that is connected to motor 166. The distribution system 170 includes an elongated first bar 162 connected to a motor through a first link 164, a second link 165 and several pivot pins. In some embodiments, first bar 162 is bent to an angle and a free end near the rotor 130.

The motor 166 and the first link 164, second link 165 rotates the first bar 162 in a curvical motion as depicted by reference number 163, causing the end of the first bar 162 to agitate and sweep feed 98 along the sloping wall 167 in a curvical motion. In this description, the term "curvical" means a curved motion that includes a series of arcuate motions from end to end. Examples include, a circle, an ellipse, other flatted convex curves, curves having both convex and concave portions as well as motions including curved and straight sections. This prevents bridging 95 of feed 98 in hopper 160 while displacing pressure along sloping wall 167 toward primary compression mechanism 130. The motion also displaces pressure within chute 137 above primary compression mechanism 130 to a portion of the interior hopper 160. Agitating or sweeping the feed 98 that is along the sloping wall prevents an arch 95 from forming.

Thus, the agricultural feed 98, which is input to the hopper 160, is forced toward the primary compression mechanism 130. The primary compression mechanism 130 includes a series or a plurality of teeth 131. The teeth force the feed in the upper portion of the hopper 160 to an outlet or exit end.

As the bagger mechanism 100 also includes a comb 132 which is positioned between the teeth 131 of the rotor 130. The comb 132 removes material or feed 98 from between various teeth 131 on the rotor 130. Thus, the comb 132 prevents the clogging of the rotor and specifically the jamming of agricultural material between the teeth 131 of the rotor 130. The rotor 130 turns in a counterclockwise direction and outputs feed at an output end 198. The output feed as depicted by a variety of arrows in the vicinity of the output end 198 of the rotor mechanism forces the feed into the tunnel 150. At the bottom of the output end 198 is an exit surface 175. As shown in FIG. 1, the exit surface 175 slopes from the output end 198 of the rotor to the tunnel 150. The exit surface 175 fits inside the tunnel 150. The bagger 100 also includes an upper bag compression mechanism 180. The upper bag compression mechanism includes a hydraulic cylinder 181, a wall 182 which is connected to the outer wall of the bagger by a pin 183. The wall 182 includes a shelf 184. The combination wall 182 and shelf 184 fit within an opening in the exterior wall of the bagger mechanism 100. The hydraulic cylinder 180 is attached to a pivot point on the combination wall and ledge so that the wall and ledge can be moved periodically to compress the upper portion of the feed into the top portion of the tunnel 150.

It should be noted that the term "piston" is defined as any mechanism that reciprocates between a compressed position and a withdrawn position. Such a piston is typically plate steel fabricated to a solid external shape that can be extended into a body of feed to compact the feed and then withdrawn to a position that allows additional feed into the volume that the wedge used to occupy. In this description, the term "wedge piston" is defined as any hinged mechanism that reciprocates between a compressed position and a withdrawn position. Such a wedge piston is typically plate steel fabricated to a solid external shape that can be extended into a body of feed to compact the feed and then withdrawn to a position that allows additional feed into the volume that the wedge used to occupy.

Figure 2:
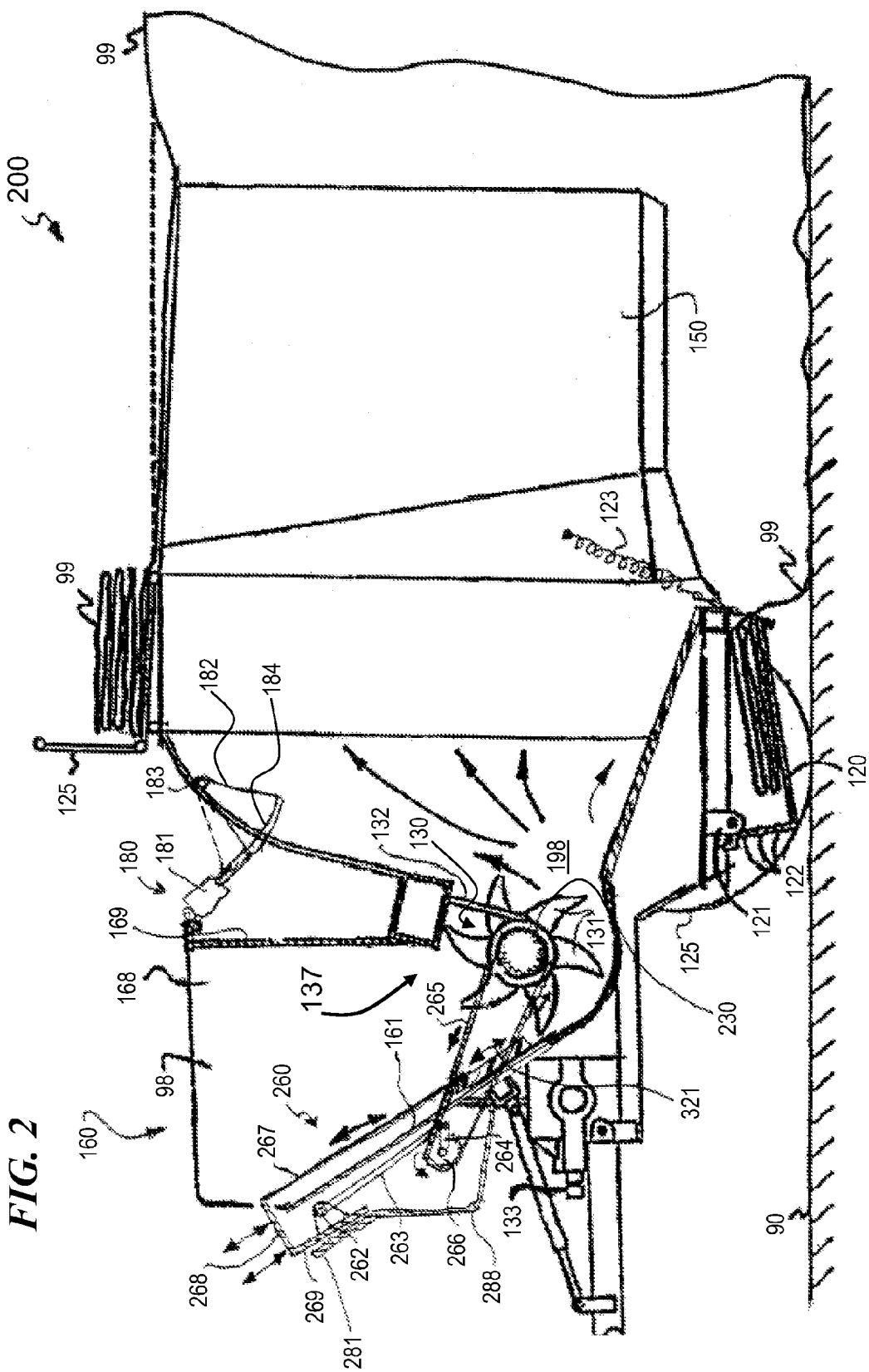
FIG. 2 shows a side view of a bagging machine 200, according to an embodiment of this invention.
Figure 3:
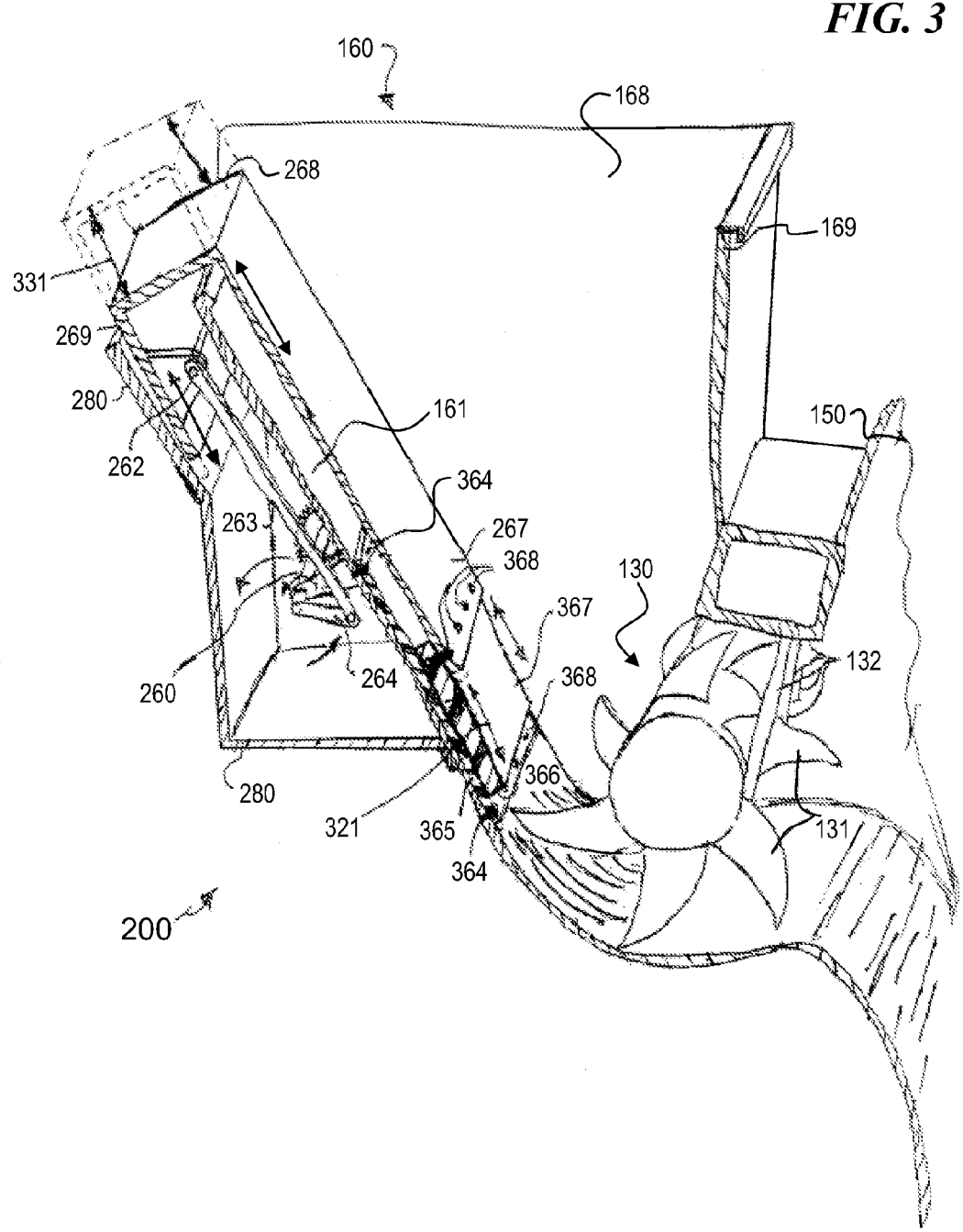
FIG. 3 shows a close-up isometric view of a bagging machine 200, according to an embodiment of this invention.

FIG. 2 shows a side view of a bagging machine 200, according to an embodiment of this invention. FIG. 3 also shows a close-up isometric view of the bagging machine 200, according to an embodiment of this invention. Now referring to both FIGS. 2 and 3, the bagging machine 200 will be described. Several aspects of the bagging machine 200 are the same as the description of the elements of bagging machine 100. Rather than repeat the description of the similar elements, the differences between bagging machine 200 and bagging machine 100 will be stressed. Other similar elements will be described as necessary to clearly describe this embodiment of the invention. The bagging machine 200 includes a hopper having a hopper wall 168 and a hopper wall 169.

The hopper 160 also includes a moving sloped wall 267. The moving sloped wall moves with respect to a fixed sloped wall 161 of the hopper. The moving sloped wall 267 is substantially J-shaped. Substantially the entire wall or a major portion of the moving sloped wall 267 that contacts the feed 98, which is input to the input or fed into the input end of the moves. The moving sloped wall 267 is moved by a wall moving mechanism 260. The J-shaped moving sloped wall 267 includes an end wall 268 and an outside wall 269. The end wall 268 forms the bottom of the J-shape, while the outside wall 269 forms the shorter upturned end of the J-shape. Affixed to the fixed wall 161 of the hopper 160 is a plastic bearing surface 365. The plastic bearing surface is attached to the fixed sloping wall 161 by a set of fasteners 364, 368, 366. In this particular embodiment the fasteners are bolts, however, the fasteners could be any type of fasteners, including rivets, adhesives, and shapes molded within the fixed wall 161 to engage the bearing plate 365. Attached to the free end of the J-shaped moving sloped wall 267 is a plastic sheet 367. The plastic sheet 367 is attached to the moving sloped wall 267 by a plurality of fasteners 368. The free end of the plastic sheet 367 rides upon the plastic bearing surface 365 as the moving sloped wall 267 moves or oscillates along a path depicted by arrows 320 and 321. It should also be noted that the moving sloped wall 267 oscillates between a position proximate the rotor 130 and a position more distant from the rotor 130. This can best be seen in FIG. 3 where the position of the end wall 268 of the moving sloped wall 267 in a position most distant from the rotor 130 is shown in phantom. Again, an arrow 331 shows the distance through which the moving sloped wall 267 moves and specifically through which the end wall 268 of the moving sloped wall 267 moved.

The rotor is rotated by placing a power takeoff to a power takeoff shaft 133 of a transmission on the bagging machine 200. The rotor 130 is also outfitted with a sprocket 230. A second sprocket 266 is attached to the rotor sprocket 230 by a chain 265. The second sprocket is attached to a shaft which is in turn attached to a bracket which is also attached to the fixed sloping wall 161 of the bagging machine 200. The size of the second sprocket 266 can be either larger or smaller than the sprocket 230 attached to the rotor 130 so as to vary the speed at which the moving wall 267 travels between a first position proximate the rotor 130 and a second position more distant from the rotor 130. In some embodiments, the sprocket 266 may be the same size as the sprocket 230. The sprocket 266 is attached to a rotating linkage 264. The rotating linkage 264 is attached to an elongated linkage arm. The elongated linkage arm 263 is in turn attached to a linkage point 262 which is attached to the moving sloping wall 267. Thus, as the sprocket 266 rotates the rotating linkage arm 264, the elongated linkage arm 263 forces the end wall to move between the position proximate the rotor and distal from the rotor.

A safety cover 280, or safety enclosure 280, is placed over the wall moving mechanism 260. Specifically, the safety enclosure 280 covers the axle, the rotating linkage arm 266, and the elongated linkage arm 263, as well as the linkage point. The safety cover (or safety enclosure) 280 serves several purposes. One purpose of the safety enclosure 280 is to prevent exposure of the operator to the rotating parts of the wall moving mechanism 260. Yet another purpose of the safety enclosure is to isolate the wall moving mechanism 260 from feed and other debris that may result from placing feed 98 into the input end of the hopper 160. Therefore, the safety enclosure 280 is not only for safety but also is for reducing the number of contaminants to which the wall moving mechanism 260 is exposed. The safety enclosure 280 is attached to the fixed sloped wall 161 of the hopper. The safety enclosure 280 surrounds the wall moving mechanism. The safety enclosure 280 also includes an upper sloped wall 281. The upper sloped wall is positioned so that the outside wall 269 of the moving sloped wall 267 does not contact the upper wall 281 of the safety enclosure. The upper wall 281 is positioned so that it is close enough to prevent substantial contaminants from entering the space around the wall moving mechanism 260.

Similar to the bagger mechanism 100, the hopper or rotor 130 has an output end 198 which forces feed into the tunnel 150. The bagging machine 200 has an exit surface 175 between the output of the rotor and the tunnel 150. The bagging machine 200 also includes an upper bag compression mechanism 180 which has a hydraulic cylinder and a wall 182 and a ledge 184 which pivot about a point 183 to further compress the feed at the top of the tunnel 150. The router 130 also includes teeth 131. The bagging mechanism 200 also includes a comb 132 which prevents clogging of the teeth by the feed 98, which is passing from the input end of the hopper 160 to the output end 198 of the rotor 130.

Figure 4:
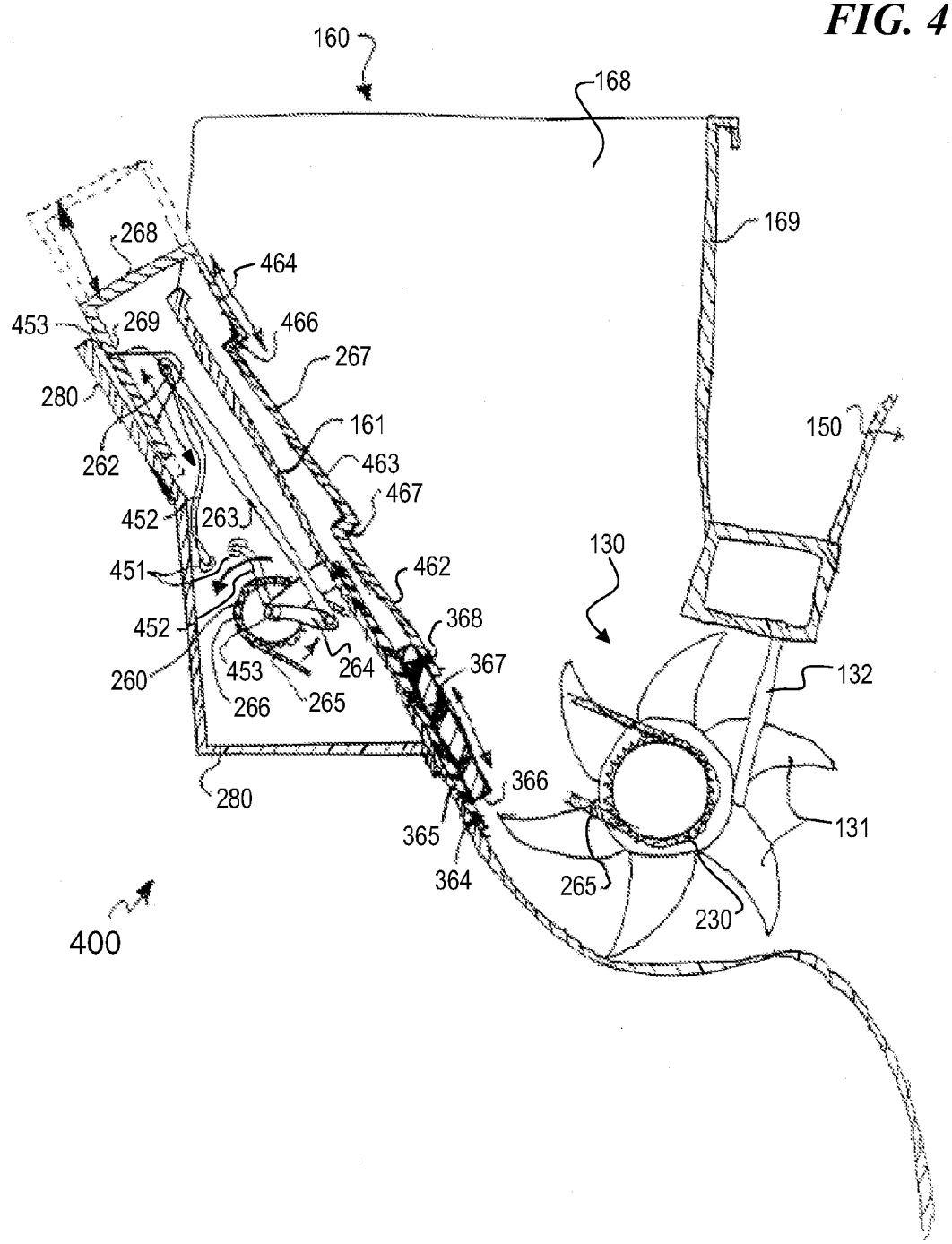
FIG. 4 shows a side view of a bagging machine 400, according to another embodiment of this invention.

FIG. 4 is a side view of a bagging machine 400, according to another embodiment of this invention. Again, many aspects of the bagging machine 200 are similar to the aspects of the bagging machine 400. As a result, some of the similar aspects will not be discussed for the sake of clarity and simplicity as well as brevity. The bagging mechanism 400 includes a fixed sloped wall 161. A J-shaped moving sloped wall 267 is moved over the sloping surface and presents a moving sloped surface to the feed which is input into the hopper 160. The moving sloping wall 267 helps to prevent a bridge or bridging 95 of the feed in the hopper 160. In this particular embodiment of the invention, the elongated wall of the moving sloping wall 267 is provided with a plurality of racket ridges 466, 467 (also called ratchet ridges). It should be noted that only two racket ridges 466, 467 are shown in this particular embodiment, however, it is contemplated that any number of racket ridges could be formed in the elongated portion of the moving sloped wall 267. The racket ridges form an additional ledge or pushing surface which compacts the feed or pushes the feed in the hopper 160 toward the primary rotator compression device 130.

Figure 5:
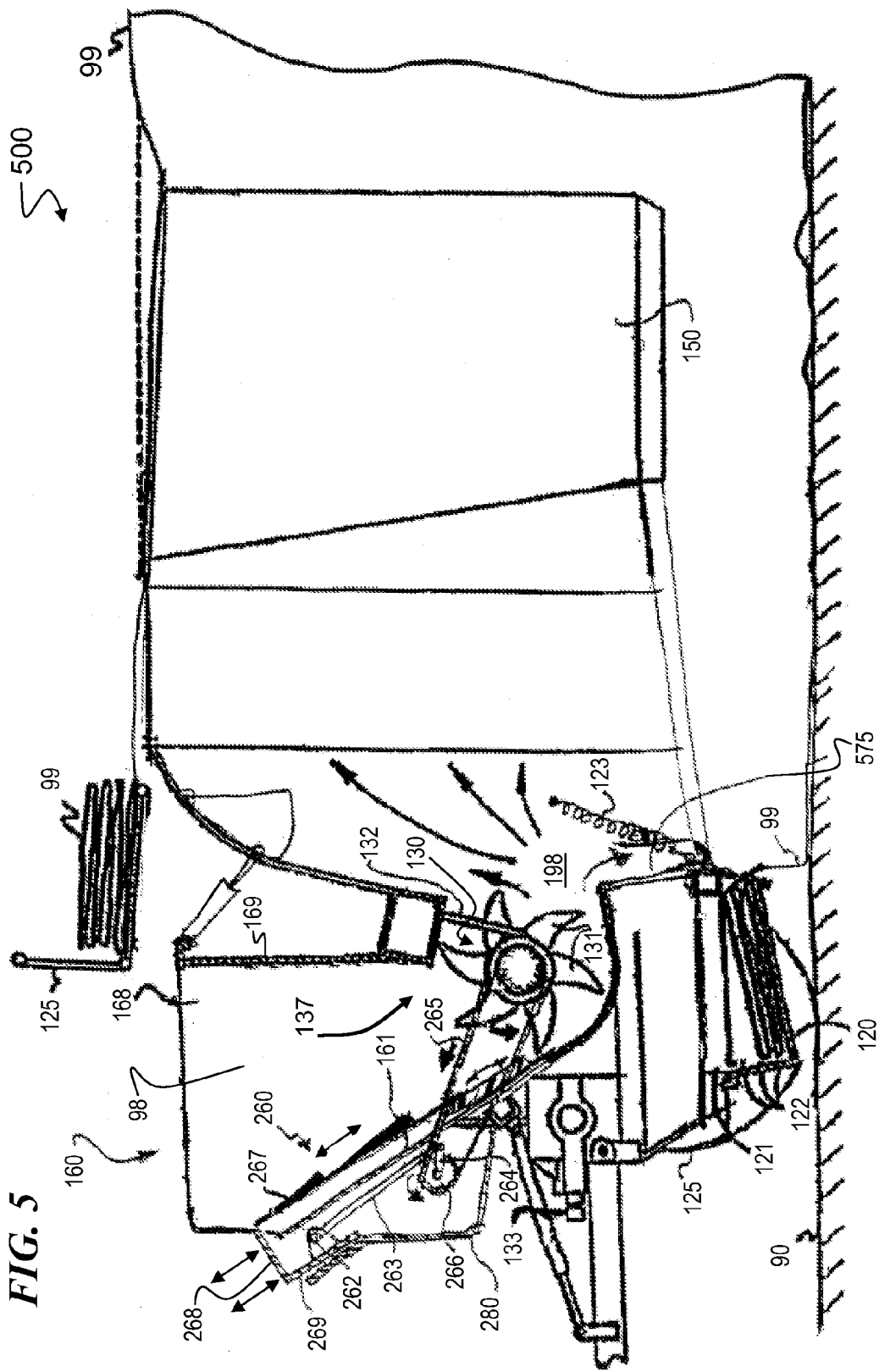
FIG. 5 shows a side view of a bagging machine 500, according to still another embodiment of this invention.
Figure 6:
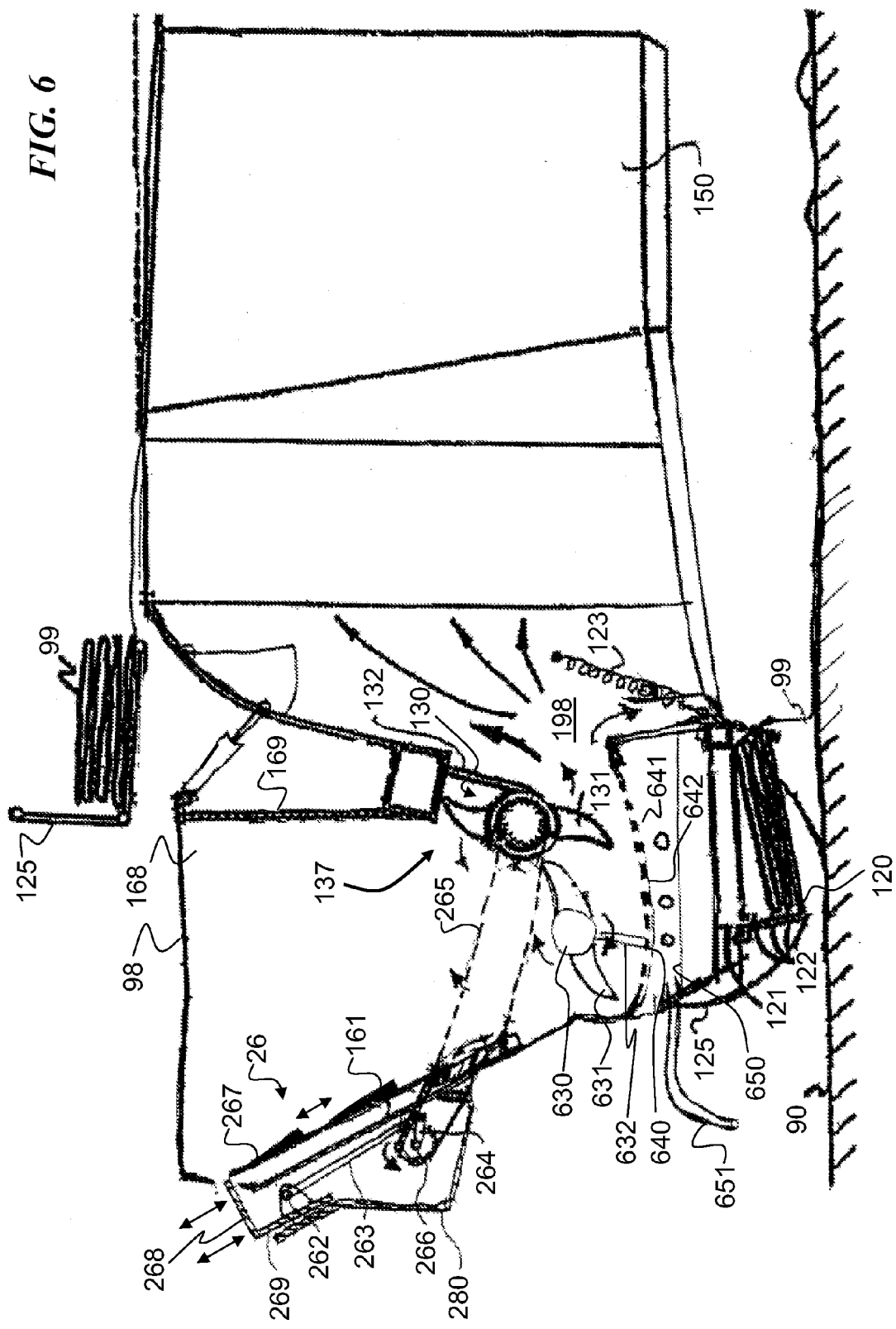
FIG. 6 shows a side view of a bagging machine 600, according to an embodiment of this invention.

The elongated wall of the J-shaped moving sloped wall 267 has a plurality of intermediate sloped portions which are positioned between the end wall 268 and the end of the elongated J portion of the moving sloped wall 267. The intermediate portions are depicted by reference numerals 462, 463, and 464. The intermediate sloping portion 463 is positioned between racket ridge 466 and 467. The intermediate sloping portion 462 is located between racket ridge 467, and the end of the J-shaped moving wall 366. Finally, intermediate wall 464 is positioned between the end wall 268 of the J-shaped sloped moving surface 267 and the racket ridge 466. It should be noted that the racket ridges 466, 467 are essentially shown as presenting horizontal surfaces or surfaces substantially parallel to the ground surface 90 (as shown in FIGS. 2, 5 and 6). However, the racket ridges could have any shape that would produce or result in an additional pushing surface presented to the feed within the hopper 160. It should be noted that chevron or V-shaped racket ridges could be formed as well as any other shape desired.

The bagging machine 400 also includes grease passageways from the outside of the safety enclosure 280 to the lubrication point of the wall moving mechanism 260. For example, a pair of zerks 451 is shown extending to the exterior surface of the safety enclosure 280. The first tube 452 is attached between a zerk and the lubrication point 453 for the axle on which the rotating linkage 464 and the sprocket 266 are attached. The tubing 452 transfers the grease from the zerk 451 to the lubrication point 453, thereby forming a lubrication path from the outside or exterior surface of the safety enclosure 280 to the lubrication point within the safety enclosure 280. Similarly extending from one of the zerks 451 to a lubrication point 262 is a section of tubing 452. The tubing 452 delivers grease to the lubrication point 262. Advantageously, lubrication paths are formed with a zerks 451 on the exterior surface of the safety enclosure so that the wall moving mechanism 260 can be lubricated without removing the safety enclosure or the cover. If the cover or the safety enclosure 280 must removed in order to grease the linkages associated with the wall moving mechanism 260, it is felt that there may be a possibility that once the cover or safety enclosure 280 is removed there may be a tendency not to replace the safety cover, thereby exposing workers or users of the bagging machine to undue danger from the reciprocating parts of the moving wall mechanism 260 and the moving wall 267.

FIG. 5 shows a side view of a bagging machine 500, according to still another embodiment of this invention. In this particular embodiment of the invention, the exit surface 175 from the rotor or primary compression mechanism 130, has been replaced with an exit surface which is substantially vertical or which has a slope between the end of the tunnel and the output end 198 of the primary compression mechanism which has a slope having an X distance which is less than the diameter of the rotor or primary compression mechanism 130. The diameter of the primary compression mechanism or rotor includes the teeth 131. As a result, the feed which is output from the output end of the rotor or primary compression mechanism drops an edge rather than passing over an exit surface 175. The passing of the exit surface 175 of the previous embodiments shown introduces friction between the feed as it is output to the tunnel 150. Therefore, by dropping it over the edge which is formed by the substantially vertical or substantially more sloped exit surface 575, the result is for a more efficient compaction of the feed into the output tunnel 150 and into the bag 99.

FIG. 6 shows a side view of a bagging machine 600, according to still another embodiment of this invention. As shown in FIG. 6, the bagging machine 600 includes a precompressor 630 having a plurality of teeth or arms 631. The precompressor takes the feed input to the hopper 160 and precompresses it before it is fed to the primary compressor 130. The precompressor 630 rotates in a first direction while the primary compressor 130 rotates in a second direction. As shown in this particular embodiment the precompressor rotates in a clockwise direction while the primary compressor 130 rotates in a counterclockwise position. The primary compressor 130 and the precompressor 630 are positioned so that the teeth of the precompressor 631 are interdigitated with the teeth 131 of the primary compressor 130. In other words, the teeth 631 of the precompressor 630 and the teeth 131 of the primary compressor 130 occupy the same space at different times.

Positioned below the precompressor is a surface 640 which includes perforation 641, 642, 643, 644. The perforations allow any juice or liquid that may be formed from compressing the feed or agricultural material to escape through the perforation 641, 642, 643, 644 to a juice collection tray 650. The juice collection tray 650 is generally sloped and has an opening 651 in one end of the juice collection tray 650. A juice pipe 660 is attached to the opening 651 and the juice collection tray 650. The juice pipe allows liquid that is formed by the precompressor or compression of the agricultural material to drip to the ground 90. The use of the precompressor 631 results in additional compression of the feed or agricultural material which is input to the hopper and eventually bagged using the bagging device 600. A comb member 632 is positioned near the precompressor 630. The comb mechanism 632 clears any feed or agricultural material that may become lodged between the teeth 631 of the precompressor 630.

In one embodiment, there is a plurality of grease zerks. Each grease zerk is connected to a flexible plastic hose. One end of each hose is connected to an individual one of the plurality of moving joints, such as rotating axles or sliding parts, in order that those moving joints can be greased from outside the safety enclosure 280 without opening the safety enclosure 280 and exposing the moving parts inside. Also in some embodiments, there is a plurality of juice drain openings 641, 642 located toward the front of the primary compression mechanism 130, to drain liquid formed by compressing and grinding the feed at the hopper end feed chute 198. Also, in some embodiments, there is a perforated surface near the precompression mechanism 630 located in front of the primary compression mechanism 130 in order to drain out liquid that is formed by compressing and grinding the feed at the hopper and feed chute. Also, in some embodiments there is a precompression mechanism located in front of the primary compression mechanism and in some embodiments the precompression mechanism is substantially the same as the primary compression pressure mechanism including a rotating body and plurality of teeth. The precompressor 630 rotates in a direction opposite the direction of rotation of the primary compression mechanism 130. In some embodiments, the precompression mechanism 630 appears first and teeth 631 interleave with the teeth 131 of the primary compression mechanism 130 in order that feed or other agricultural material is pushed towards the primary mechanism, and also in order to enlarge the exit opening at the bottom of the hopper by having a larger total mechanism to move the feed through the primary compression mechanism.

Figure 7:
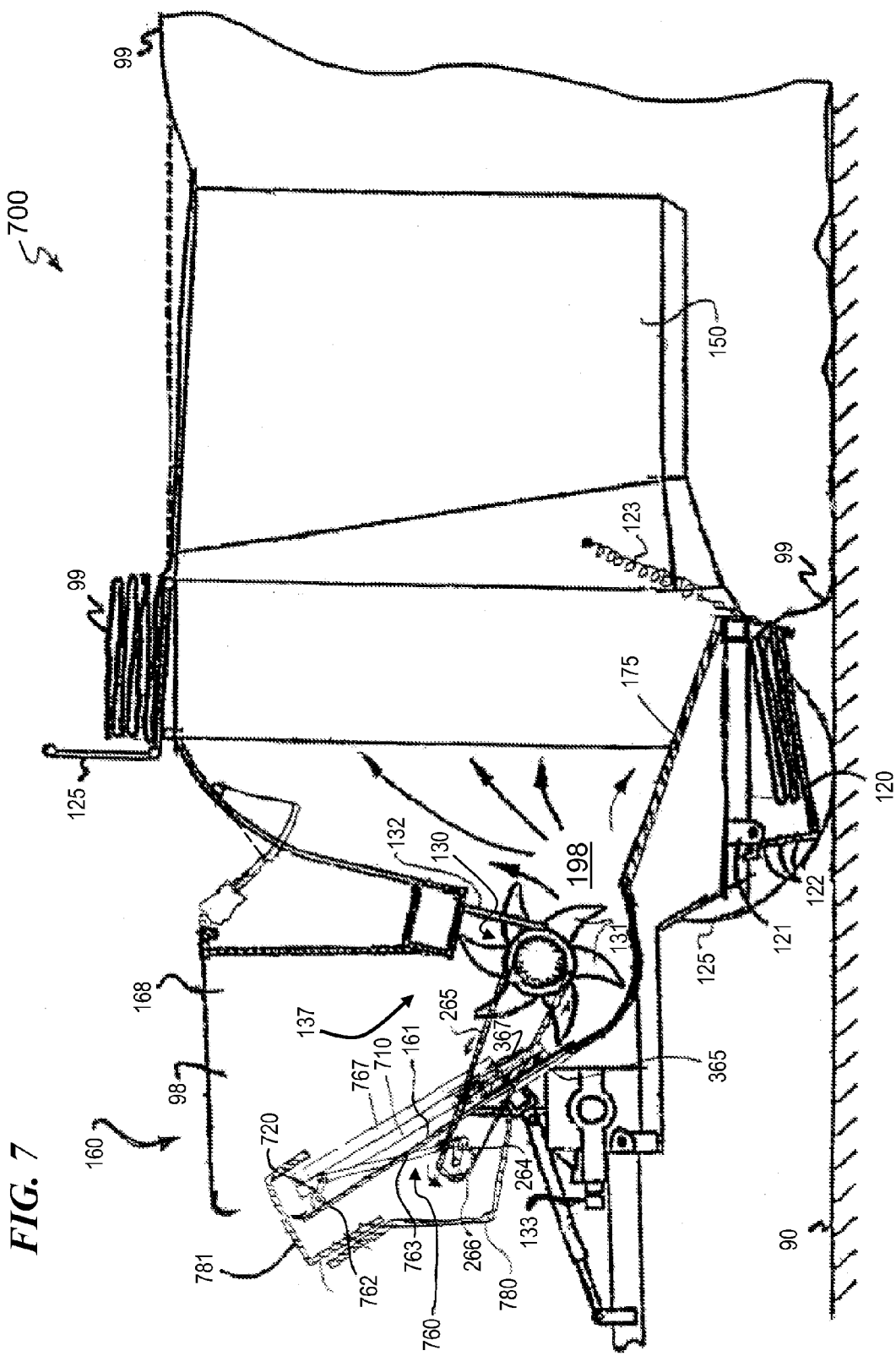
FIG. 7 shows a side view of a bagging machine 700, according to an embodiment of this invention.
Figure 8:
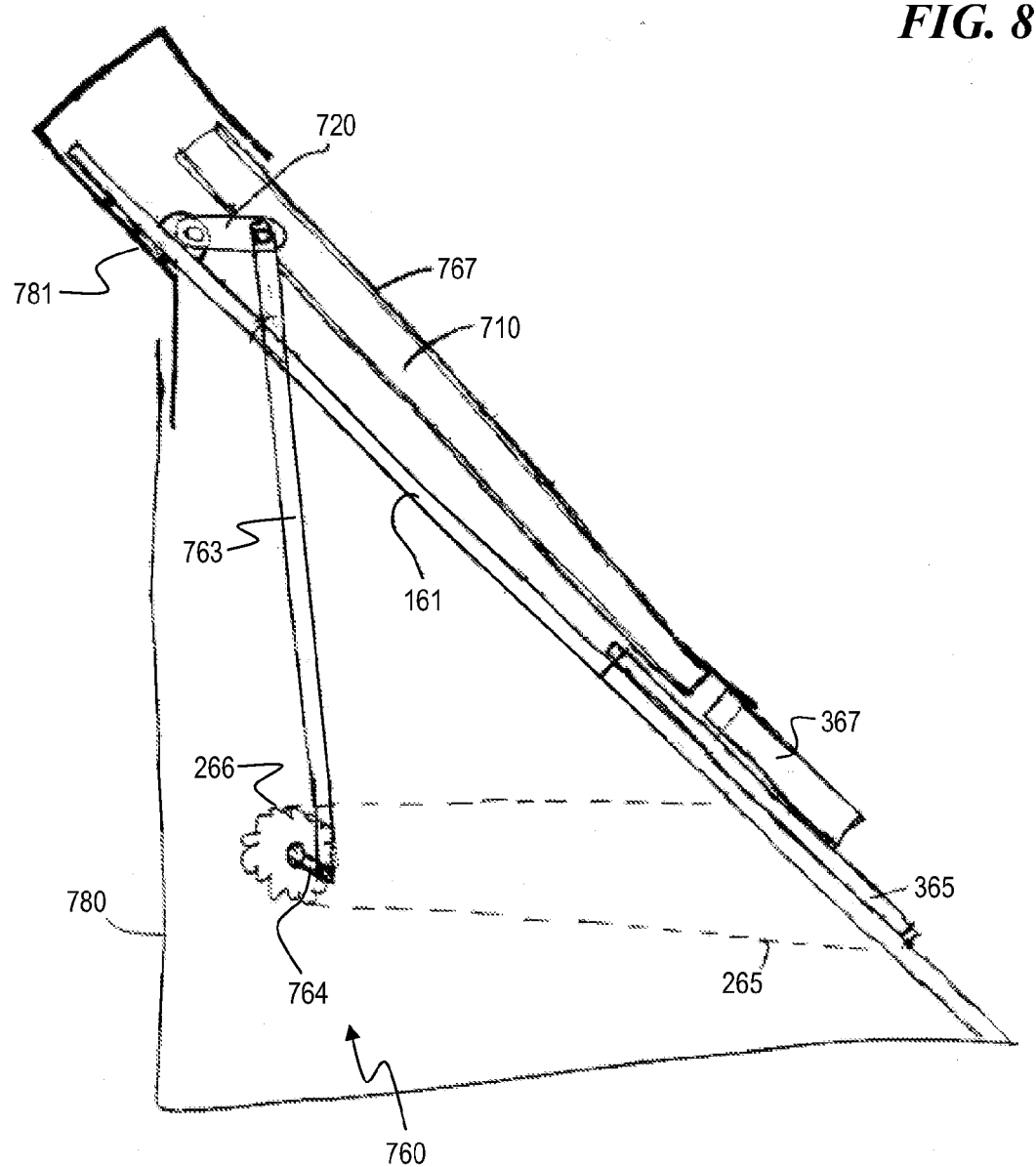
FIG. 8 is a site view of a portion of the bagging machine according to an embodiment of this invention.

FIG. 7 shows a side view of a bagging machine 700, according to an embodiment of this invention. FIG. 8 shows a side view of a wall moving mechanism. Now referring to both FIGS. 7 and 8, the bagging machine 700 will be described. Several aspects of the bagging machine 700 are the same as the description of the elements of bagging machine 200. The bagging machine 700 includes a hopper having a hopper wall 168.

The hopper 160 also includes a moving sloped wall 767. The moving sloped wall 767 moves with respect to a fixed sloped wall 161 of the hopper. Substantially the entire wall 767 or a major portion of the moving sloped wall 767 that contacts the feed 98. The moving sloped wall 767 is moved by a wall moving mechanism 760. The moving sloped wall 767 includes a pair of I-beam stiffeners 710 (only one is shown in FIGS. 7 and 8) attached to the surface opposite the hopper 160. Affixed to the fixed wall 161 of the hopper 160 is a plastic bearing surface 365. The plastic bearing surface is attached to the fixed sloping wall 161 by a set of fasteners. In this particular embodiment the fasteners are bolts, however, the fasteners could be any type of fasteners, including rivets, adhesives, and shapes molded within the fixed wall 161 to engage the bearing plate 365. Attached to the free end of the moving sloped wall 767 is a plastic sheet 367. The plastic sheet 367 is attached to the moving sloped wall 767 by a plurality of fasteners 368. The free end of the plastic sheet 367 rides upon the plastic bearing surface 365 as the moving sloped wall 267 moves or oscillates along a path depicted by arrows 320 and 321. It should also be noted that the moving sloped wall 267 oscillates between a position proximate the rotor 130 and a position more distant from the rotor 130. This can best be seen in FIG. 3 where the position of the end wall 268 of the moving sloped wall 267 in a position most distant from the rotor 130 is shown in phantom. Again, an arrow 331 shows the distance through which the moving sloped wall 267 moves and specifically through which the end wall 268 of the moving sloped wall 267 moved.

The primary compression rotor 130 is rotated by placing a power takeoff to a power takeoff shaft 133 of a transmission on the bagging machine 200. The rotor 130 is also outfitted with a sprocket 230. A second sprocket 266 is attached to the rotor sprocket 230 by a chain 265. The second sprocket is attached to a shaft which is in turn attached to a bracket which is also attached to the fixed sloping wall 161 of the bagging machine 700. The size of the second sprocket 266 can be either larger or smaller than the sprocket 230 attached to the rotor 130 so as to vary the speed at which the moving wall 767 travels between a first position proximate the rotor 130 and a second position more distant from the rotor 130. In some embodiments, the sprocket 266 may be the same size as the sprocket 230. The sprocket 266 is attached to a rotating linkage 764. The rotating linkage 764 is attached to an elongated linkage arm 763. The elongated linkage arm 763 is in turn attached to an upper linkage arm 720. The upper linkage arm is attached to an axle between the I-beams 710 of the moving wall 767. The upper linkage arm 720 is attached to a linkage point 762 which is attached to the fixed wall 161. The elongated linkage arm 763 extends through an opening in the fixed wall 161. Thus, as the sprocket 266 rotates the rotating linkage arm 764, the elongated linkage arm 763 and the upper linkage arm 720 move the sloping moving wall 767 between the position proximate the rotor 130 and distal from the rotor 130.

A safety cover 780, or safety enclosure 780, is placed over the wall moving mechanism 760. A second safety cover 781 covers an upper portion of the moving wall 767. The safety enclosures 780, 781 serve several purposes. One purpose of the safety enclosures 780, 781 is to prevent exposure of the operator to the rotating parts of the wall moving mechanism 760. Yet another purpose of the safety enclosures 780, 781 is to isolate the wall moving mechanism 760 from feed and other debris that may result from placing feed 98 into the input end of the hopper 160. Therefore, the safety enclosure 780 is not only for safety but also is for reducing the number of contaminants to which the wall moving mechanism 760 is exposed. The safety enclosures 780, 781 are attached to the fixed sloped wall 161 of the hopper.

The bagger mechanism 700 has a rotor output end 198 which forces feed into the tunnel 150. The bagging machine 700 has an exit surface 175 between the output of the rotor and the tunnel 150. The bagging machine 700 also includes an upper bag compression mechanism 180 which has a hydraulic cylinder and a wall 182 and a ledge 184 which pivot about a point 183 to further compress the feed at the top of the tunnel 150. The router 130 also includes teeth 131. The bagging mechanism 700 also includes a comb 132 which prevents clogging of the teeth by the feed 98, which is passing from the input end of the hopper 160 to the output end 198 of the rotor 130.

Other embodiments of the bagger mechanism 700 include a moving wall with features to aid compaction of the feed 98, or a precompressor and a primary compressor. In other words, each of the embodiments shown in FIGS. 2–6 could include the drive mechanism 760 shown in FIGS. 7–8.

One aspect of the invention, in some embodiments, includes an agricultural bagger apparatus for compacting feed into a horizontally deployed bag. This apparatus includes a primary compression mechanism, and a hopper that receives agricultural feed, the hopper further including: an input hopper portion that includes a first hopper wall, and a lower end exit chute connected to the primary compression mechanism, wherein a major portion of the hopper wall moves relative to the rest of the hopper to urge feed towards the primary compression mechanism.

In some embodiments of the apparatus, the first hopper wall is a sloped wall that moves in an oscillating motion.

In some embodiments of the apparatus, the first hopper wall includes a first ridge, and a second ridge wherein the first and second ridges are configured to push the agricultural feed in the hopper toward the primary compression mechanism as the first hopper wall moves.

In some embodiments of the apparatus, the first hopper wall is a sloped wall that moves in an oscillating up-and-down motion.

In some embodiments of the apparatus, the first hopper wall further includes an inner wall plate, an outer wall plate, an end wall connecting the inner wall to the outer wall plate, a linkage point attached to a portion of at least one of the inner wall, the outer wall and the end wall, and a wall moving mechanism attached to the linkage point to move the first hopper wall.

In some embodiments of the apparatus, the linkage point is attached to a surface of the first hopper wall isolated from a surface of the first hopper wall that contacts feed.

Some embodiments of the apparatus further include a safety enclosure attached to the first hopper to enclose a portion of the first hopper wall, the linkage point and the wall-moving mechanism.

Some embodiments of the apparatus further include at least one grease path having a first end on an exterior surface of the safety enclosure and a second end connect to a moving joint of the wall-moving mechanism.

In some embodiments of the apparatus, the wall moving mechanism further include a sprocket, and a rotating linkage arm attached between the sprocket and the linkage point.

In some embodiments of the apparatus, the wall moving mechanism further includes: a sprocket, a first linkage arm attached to the sprocket, and a second linkage arm attached to the first linkage arm and the linkage point.

In some embodiments of the apparatus, the wall moving mechanism further includes a chain, the chain attached to drive power between the sprocket and the primary compression mechanism.

Some embodiments of the apparatus further include a secondary compression mechanism located near the primary compression mechanism.

Some embodiments of the apparatus further include an output tunnel, and a secondary compression means for further compacting feed primarily in an upper portion of the tunnel.

In some embodiments of the apparatus, the primary compression mechanism rotates in a first direction and the secondary compression mechanism rotates in a second direction different from the first direction.

In some embodiments of the apparatus, the primary compression mechanism further comprises a first set of teeth and wherein the secondary compression mechanism includes a second set of teeth, the first set of teeth interdigitated with the second set of teeth as the primary compression mechanism rotates and the second compression mechanism rotates.

Some embodiments of the apparatus further include a tunnel, wherein the primary compression mechanism is located near a first portion of the tunnel, and an upper compression mechanism located near a second portion of the tunnel, the upper compression mechanism connected to the tunnel to further compress feed at a distance above the primary compression mechanism and toward an upper portion of the tunnel cavity.

In some embodiments of the apparatus, the first hopper wall includes a plastic end portion and wherein the apparatus further comprises a plastic bearing plate associated with at least a portion of the hopper, the plastic end portion of the hopper wall contacting the plastic bearing plate as the hopper wall moves.

Some embodiments of the apparatus further include a tunnel, wherein the primary compression mechanism is located near a first portion of the tunnel, and an exit surface positioned between an exit end of the primary compression mechanism and the tunnel, wherein the exit surface is substantially vertically orientated.

Some embodiments of the apparatus further include a tunnel, wherein the primary compression mechanism is located near a first portion of the tunnel, and an exit surface positioned between an exit end of the primary compression mechanism and the tunnel, wherein the exit surface is sloped over a distance less than the diameter of the primary compression mechanism.

An aspect of some embodiments of the invention includes a method for improving the flow of agricultural feed in an agricultural feed stock bagging machine having a tunnel and a primary compression mechanism fed by a hopper. This method includes providing the hopper with at least two walls, and moving a major portion of at least one of the two walls of the hopper relative to the other wall.

Some embodiments of the method further include sloping the major portion of at least one of the two walls of the hopper toward the primary compression mechanism.

Some embodiments of the method further include covering a mechanism for moving a major portion of at least one of the two walls of the hopper.

Some embodiments of the method further include conducting grease to a moving major portion of at least one of the two walls of the hopper from a connector at a position remote from the mechanism.

An aspect of some embodiments of the invention includes an apparatus for compacting feed into a horizontally deployed bag, the apparatus including an input hopper, and means, as described herein and equivalents thereto, and means for moving a major portion of at least one wall of the hopper.

In some embodiments,

Some embodiments of the apparatus further include means, as described herein and equivalents thereto, for placing grease on a sliding interface of the at least one wall of the hopper.

It is understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for improving the flow of agricultural feed in an agricultural feed stock bagging machine having an output tunnel and a primary compression mechanism, the method comprising:

provding a hopper with at least a first wall and a second wall in communication with the primary compression mechanism;

moving at least a major portion of the first wall in a direction substantially parallel and slidingly relative to the second wall to urge the feed toward the primary compression mechanism; and compressing the feed with the primary compression mechanism into the tunnel and then into a bag surrounding the tunnel.

2. The method of claim 1 wherein moving at least a major portion of the first wall includes oscillating a major component of the first wall in up-and-down directions.

3. The method of claim 1 wherein the first wall includes at least one ratchet ridge having a pushing face directed generally perpendicular to a moving direction of the major portion of the first wall, and a sliding face substantially parallel to the moving direction.

4. The method of claim 1 further comprising sloping the major portion of the first wall of the hopper toward the primary compression mechanism.

5. The method of claim 1, further comprising covering a mechanism for moving the major portion of the first wall of the hopper.

6. The method of claim 5, further comprising greasing the mechanism for moving the major portion the first wall of the hopper from a position remote from the mechanism.

7. An agricultural bagger apparatus for compacting feed into a horizontally deployed bag, the apparatus comprising:
an input hopper;
a primary compressor in communication to receive feed from the hopper;
the input hopper including moving wall means for moving feed through the hopper toward the primary compressor, and means for moving the moving wall means; and
a tunnel operatively coupled to the primary compressor and configured to receive compacted feed from the primary compressor into the tunnel and into a bag surrounding the tunnel.

8. The apparatus of claim 7, further comprising:
means for safety enclosing at least some moving parts of the moving wall means; and
conducting means for conducting grease from outside the means for enclosing and placing the grease on a sliding interface of the moving wall means of the hopper that is inside the means for safety enclosing.

9. The apparatus of claim 7, further comprising:
ratchet means for pushing feed in a direction toward the primary compressor.

10. An agricultural bagger apparatus for compacting feed into a horizontally deployed bag, the apparatus comprising:
a primary compression mechanism; and
a hopper that receives agricultural feed, the hopper further including:
an input hopper portion that includes a first hopper wall, the first hopper wall comprising a fixed wall portion and a major wall portion, the major wall portion slidingly movable relative to the fixed wall portion to urge feed toward the primary compression mechanism;
a lower end exit chute connected to the primary compression mechanism; and
a wall-moving mechanism connected to the first hopper wall for slidingly moving the major wall portion relative to the fixed wall portion.

11. The apparatus of claim 10, wherein the first hopper wall is a sloped wall and the major wall portion moves in an oscillating motion against feed in the hopper.

12. The apparatus of claim 10, wherein the major wall portion of the first hopper wall includes:
a first ridge; and
a second ridge wherein the first and second ridges are configured to push the feed in the hopper toward the primary compression mechanism as the major wall portion of the first hopper wall moves.

13. The apparatus of claim 12, wherein the first hopper wall is a sloped wall sloping downward towards the compression mechanism and the major wall portion moves in an oscillating up-and-down motion.

14. The apparatus of claim 10, wherein the major wall portion of the first hopper wall further comprises;
an inner wall;
an outer wall;
an end wall connecting the inner wall to the outer wall;
a linkage point attached to a portion of at least one of the inner wall, the outer wall and the end wall; and
the wall-moving mechanism attached to the linkage point to move the major wall portion of the first hopper wall.

15. The apparatus of claim 14, wherein the linkage point is attached to a surface of the major wall portion of the first hopper wall isolated from a surface of the major wall portion of the first hopper wall that contacts feed.

16. The apparatus of claim 14, further comprising a safety enclosure attached to the first hopper wall to enclose a portion of the first hopper wall, the linkage point and the wall-moving mechanism.

17. The apparatus of claim 16, further comprising at least one grease path having a first end on an exterior surface of the safety enclosure and a second end connect to a moving joint of the wall-moving mechanism.

18. The apparatus of claim 14, wherein the wall moving mechanism further comprises:
a sprocket; and
a rotating linkage arm attached between the sprocket and the linkage point.

19. The apparatus of claim 14, wherein the wall moving mechanism further comprises:
a sprocket;
a first linkage arm attached to the sprocket; and
a second linkage arm attached to the first linkage arm and the linkage point.

20. The apparatus of claim 19, wherein the wall moving mechanism further comprises a chain, the chain attached to drive power between the sprocket and the primary compression mechanism.

21. The apparatus of claim 10, further comprising:
an output tunnel; and
a secondary compression mechanism for further compacting feed primarily in an upper portion of the tunnel.

22. The apparatus of claim 10, further comprising:
an output tunnel; and
a secondary compression mechanism, wherein the primary compression mechanism rotates in a first direction and the secondary compression mechanism includes a portion that rotates in a second direction different from the first direction.

23. The apparatus of claim 22, wherein the primary compression mechanism further comprises a first set of teeth and wherein the secondary compression mechanism includes a second set of teeth, the first set of teeth interdigitated with the second set of teeth as the primary compression mechanism rotates and the second compression mechanism rotates.

24. The apparatus of claim 10, wherein the major wall portion of the first hopper wall includes a plastic end portion and wherein the hopper further comprises a plastic bearing plate associated with at least a portion of the fixed wall portion, the plastic end portion of the major wall portion of the first hopper wall contacting the plastic bearing plate as the major wall portion of the hopper wall moves.

25. The apparatus of claim 10 further comprising:

a tunnel, wherein the primary compression mechanism is located near a first portion of the tunnel; and an exit surface positioned between an exit end of the primary compression mechanism and a ground surface beneath the tunnel, wherein the exit surface is substantially vertically orientated from the compressor exit downward toward the ground.

26. The apparatus of claim 10, further comprising:

an output tunnel; and a precompression mechanism, wherein the primary compression mechanism is a toothed cylinder that rotates in a first direction and the precompression mechanism is a toothed cylinder that rotates in a second direction different from the first direction, and wherein the primary compression mechanism and the precompression mechanism both engage feed from a lower end of the hopper.

27. The apparatus of claim 10, further comprising:

an output tunnel; and a precompression mechanism, wherein the primary compression mechanism is a toothed cylinder that rotates in a first direction and the precompression mechanism is a toothed cylinder that rotates in a second direction different from the first direction, and wherein the primary compression mechanism and the precompression mechanism both engage feed from a lower end of the hopper, wherein the primary compression mechanism further comprises a first set of teeth and wherein the precompression mechanism includes a second set of teeth, the first set of teeth interdigitated with the second set of teeth as the primary compression mechanism rotates and the second compression mechanism rotates.

28. The apparatus of claim 10, further comprising:

a tunnel operatively coupled to the primary compression mechanism and configured to receive compacted feed from the primary compression mechanism into the tunnel and into a bag surrounding the tunnel.

\* \* \* \* \*